United States Patent Office 3,423,503
Patented Jan. 21, 1969

3,423,503
MOLD RELEASE AGENT CONTAINING A POLY-
OLEFIN AND THE REACTION PRODUCT OF
DICYCLOPENTADIENE AND A PHENOL
Monte H. York, Akron, Ohio, assignor to The Goodyear
Tire & Rubber Company, Akron, Ohio, a corporation
of Ohio
No Drawing. Filed Sept. 11, 1964, Ser. No. 395,917
U.S. Cl. 264—338    2 Claims
Int. Cl. B28b 7/38, 7/36

ABSTRACT OF THE DISCLOSURE

An improved method for molding polyurethane wherein the mold release agent is a polyolefin having from 2 to about 4 carbon atoms in a melting point of about 100 to 250° F. within a suitable carrier and the polyolefin contains about .3 to about 5 parts of an antioxidant formed by reacting a phenol with a dicyclopentadiene.

---

This invention relates to a method of preparing an improved mold releasing agent, to said agent and a method of using said agent.

In making polyurethane foam products and other castable goods it is essential that the mold for shaping the foam product or cast article does not adhere to the cured polyurethane article. This result is normally achieved by treating the mold with a mold releasing agent. Where the mold is subjected to heat treatment during the curing of the polyurethane article, there is a tendency for the mold release agent to build up within the mold and to produce a cake of material which leads to discoloration and mold releasing difficulties. Particularly is this true in a continuous line production where trouble results in the line being shut down, thereby subjecting the mold to high temperature without being cooled for prolonged periods.

It is an object of this invention to provide a mold releasing agent which is free of the tendencies to produce the aforesaid difficulties during ordinary periods of heat treatment.

This object may be accomplished by adding about 0.3 to about 5 parts and preferably about 1.5 to 3 parts of an antioxidant of the type hereinafter described for each hundred parts of a polyolefin mold releasing agent.

The polyolefin useful for the mold releasing agent of this invention is a polymer of an alpha olefin having from 2 to about 4 carbon atoms and a melting point of about 100 to about 250° F. Representative examples of these polymers are the polyethylenes, polypropylenes and mixtures of these, or copolymers of ethylene and propylene.

Normally the polyolefin is suspended or dissolved in an inert carrier to facilitate its application to the mold by such well known methods as brush or spray applications. The amount of carrier used with the polyolefin will vary widely depending on the molecular weight and melting point of the polyolefin and solvent power of the carrier.

Thus, in some cases only 5 to 10% by weight of carrier may be needed while in others the amount may be 50% or even as high as 80 to 90%. The amount used usually will be sufficient to permit the mold release composition to be applied as by brushing or spraying.

The carrier should not have a deleterious effect on the molded product and should be volatile at the temperature of the mold, usually about 250° F. or lower. Representative carriers are water and the low boiling hydrocarbons having an end point on ASTM distillation of less than about 520° F.

To be more specific, a laboratory mold of 12"x12"x2" having a floating top plate was cleaned by blasting with walnut shell flour to remove any of the debris from the previous molding operation. The mold freshly cleaned was waxed to insure a good release of the molded object. A polyurethane foamable mixture then was poured into the wax coated mold and allowed to react and cure before being stripped. This mold was rewaxed and the lid clamped shut and the empty mold was placed in a 525° oven for 5 minutes. The mold was removed from the oven, cooled and another polyurethane foamable mixture poured and allowed to react and cure before being stripped. If the release of the polyurethane foam from the mold was satisfactory, the pass was repeated using 8 minutes in the 525° F. oven. If release was satisfactory after this 8 minutes in the oven, the mold release agent was judged to be satisfactory for the conditions experienced in normal continuous foam operation. It should be noted that the release agents of the polyolefin type normally fail to release after 5 minutes in a 525° F. oven where the antioxidant is not present in the releasing agent.

The following examples are illustrative of the present invention:

EXAMPLE I

One pound of polyethylene having a density of .91, a molecular weight of 1500 and a melting point (ASTM E-2851T) of about 210–230° F. was dissolved in sufficient low flash naphtha to give a 16% dispersion, then sufficient amounts of the antioxidants listed in Table 1 were blended into the low flash naphtha dispersion of the polyethylene to give a antioxidant concentration of 2.5 parts per hundred parts of a polyethylene. This mold release agent containing the antioxidant was sprayed upon a freshly shell blasted mold and its ability to release a polyurethane composition was determined after being exposed for 8 minutes in an oven at 525° F. If the antioxidants gave satisfactory releasing activity after being exposed for 8 minutes at a temperature of 525° F., it was rated pass in Table 1.

Table 1

Antioxidant: Rating
Methylene bis - 2 - tertiary butyl - 4 - methyl phenol _____ Pass
2,6-bis (2'-hydroxy-3'-tertiary butyl-5'-methyl benzoyl)-4-methyl phenol _____ Pass The polyurethane foamable composition utilized in the above test included the following ingredients and was mixed in a one-step mixing machine.

(1) 100 parts of a polypropylene ether glycol of about 1500 to 3000 molecular weight;
(2) 100 parts of a polypropylene ether triol of about 1500 to 3000 molecular weight;
(3) approximately 10 parts of trichlorofluoro methane;
(4) 84 to 88 parts of toluene diisocyanate (80/20 isomer);
(5) 5.6 parts water;
(6) 0.4 part stannous octate;
(7) 0.4 part of triethylene diamine;
(8) 0.4–.8 part of an N-ethyl morpholine;
(9) 4–6 parts of a silicone which contains blocked polymeric groups of the polyoxy ethylene and the polyoxy propylene types.

Other bis phenols of the class consisting of methylene-bis-tertiary alkyl alkyl phenol and bis(hydroxytertiary alkyl alkyl benzoyl), alkyl phenol where the alkyl radical bis 1 to 8 carbon atoms may be used in the above example to give satisfactory antioxidant action.

The following examples are illustrative of the preparation of the antioxidant useful in the present invention but are not intended as limitations on the scope of the invention.

EXAMPLE II

Three hundred and thirty grams of para-cresol and 9.0 grams of a phenol BF₃ complex containing 26 percent BF₃ were heated to 100° C. and then 132 grams of dicyclopentadiene were added over a period of three and one-half hours. The excess para-cresol was removed by heating to a column temperature of 150° C. at 4 mm., this procedure also removed the BF₃ catalyst. A residue of 316 grams was obtained.

Two hundred and thirty-six grams of this product were dissolved in an equal weight of toluene and 4.0 grams of H₂SO₄ added. The solution was heated to 80° C. and 168 grams of isobutene added over a period of one and three-fourths hours. The mixture was heated one hour longer then the catalyst was destroyed with a Na₂CO₃ solution. Volatiles and unreacted materials were removed by heating to 175° C. at 30 mm. Catalyst residues were removed by filtration. Weight of the product was 313 grams.

EXAMPLE III

Three hundred and seventy-six grams of phenol and 9 grams of a phenol BF₃ complex containing 26 percent BF₃ were heated to 90° C. One hundred and thirty-two grams of dicyclopentadiene were then added in one hour between 90 and 107° C. The mixture was held at this temperature several hours longer. Then heated to 180° C. at 15 mm. to remove the BF₃ and the unreacted phenol. A yield of 291 grams of a hard resin was obtained. The ratio of phenol to dicyclopentadiene was 1.69 to 1.

EXAMPLE IV

The procedure of Example I was repeated except the antioxidant used was prepared according to the procedure of Example II. This mold release agent gave satisfactory release after the doped mold had been held at 525° F. for 8 minutes.

Other satisfactory antioxidants useful in this invention may be made by procedure of Example II using instead of para-cresol the following phenolic materials: phenol, paraethyl phenol, mixed meta-para-cresols, tertiary butyl meta cresol, tertiary butyl ortho cresol, 2,4-ditertiary butyl phenol, 2,4-dimethyl phenol and para methoxy phenol. Where the phenolic material is highly alkylated, the alkylation step may be omitted after the reaction thereof with the dicyclopentadiene, but the resulting antioxidant is not as effective as the after alkylation products. Antioxidants of this type are illustrated by Examples V to VII.

EXAMPLE V

Two hundred grams of 2,4-ditertiary butyl phenol and 6 grams of a para-cresol BF₃ complex were heated to 80° C. and then 66 grams of dicyclopentadiene added in two hours. Reacted two hours longer then added a Na₂CO₃ solution to kill the catalyst and heated to 190° C. at 8 mm. to remove volatiles and unreacted materials. Weight of the product was 196 grams.

EXAMPLE VI

Two hundred grams of 2,4-dimethyl phenol and 5.0 grams of a phenol BF₃ complex were heated to 77° C. Seventy-three grams of dicyclopentadiene were then added in one hour. The mixture was held at 80° C. for two more hours, then heated to 190° C. at 10 mm. to remove catalyst and excess 2,4-dimethyl phenol. Weight of the product was 191 grams.

EXAMPLE VII

Five hundred grams of 6-tertiary butyl-para-cresol were mixed with 10 grams of a para-cresol BF₃ complex and heated to 68° C. One hundred and thirty-two grams of dicyclopentadiene were then added in one and one-half hours. The mixture was held at 80° C. for another hour. Volatiles and unreacted materials were removed by heating to 175° C. at 1 mm. Weight of product was 403 grams. Molar ratio of 6-tertiary butyl-para-cresol to dicyclopentadiene was 1.65 to 1.

In accordance with the present invention one class of very effective antioxidants are prepared by a two-step process which involves reacting one mol of dicyclopentadiene with at least one mol of a phenolic compound selected from the group consisting of phenol, para-cresol, mixed meta-para-cresol and para-ethyl phenol in the presence of a Friedel-Crafts type catalyst. More specifically, the phenolic materials that are effectively reacted with dicyclopentadiene in accordance with the first step of the present process may be defined as phenolic compounds conforming to the following structure

wherein R is a radical selected from the group consisting of hydrogen, methyl and ethyl. Preferred proportions of reactants in the resulting product are from 1.50 to 1.75 mols of phenolic compound per mol of dicyclopentadiene. This reaction product of dicyclopentadiene and phenolic compound is subsequently alkylated with at least one-half mol of a tertiary olefinic material per mol of dicyclopentadiene, said tertiary olefinic material being selected from the group consisting of isobutylene, tertiary hexenes and tertiary pentenes.

The amount of olefinic material to be employed will depend upon the phenolic compound used and also upon the molar ratio of phenolic compound and dicyclopentadiene in the reaction product. Thus the product prepared from phenol and dicyclopentadiene will react with more of the olefinic compound than the product from para-cresol also a reaction product of phenol containing a 2:1 molar ratio of phenol and dicyclopentadiene will react with more olefin than a 1:1 product. While products that are incompletely alkylated possess superior antioxidant properties compared to unalkylated products, preferred products are those in which alkylation is substantially complete. Preferred proportions of reactants in the final alkylation product are from 1.0 to 2.0 mols of tertiary olefinic material per mol of dicyclopentadiene when para-cresol, mixtures of meta-para-cresol and para-ethyl phenol are reacted with dicyclopentadiene to produce the product of step one. The preferred proportions of reactants in the final alkylation product are from 2.0 to 4.0 mols of tertiary olefinic material per mol of dicyclopentadiene when phenol is reacted with dicyclopentadiene to produce the product of step one. A slight excess of the alkylating agent is generally employed to assure that the desired amount reacts with the product from stage one. The reaction products prepared in accordance with the above described procedure have been found to be much more effective as rubber antioxidants than the one-step reaction products prepared by reacting dicyclopentadiene with phenolic materials the nucleus of which is already substituted with tertiary hydrocarbon groups.

The reaction between dicyclopentadiene and the phenolic compounds is effectively catalyzed by a Friedel-Crafts type catalyst, and in particular the more potent Friedel-Crafts catalysts such as aluminum chloride, zinc chloride, ferrous and ferric choride and boron trifluoride, as well as complexes based on boron trifluoride. Boron trifluoride and complexes based on boron trifluoride are preferred catalysts for the first step of the disclosed process. The second step of the above described two-step reaction process, wherein the product obtained by reacting dicyclopentadiene and a phenolic compound is further alkylated with a tertiary olefin, is effectively catalyzed by employing one or more of the customary acidic alkylation catalysts such as sulfuric acid, benzene sulfonic acid, toluene sulfonic acid, acid activated clays, boron trifluoride, zinc chloride, ferrous and ferric halides, aluminum halides and the stannous and stannic halides. Sulfuric acid, benzene sulfonic acid, toluene sulfonic acid and acid activated clay are preferred catalysts for the second step of the disclosed process. The catalysts employed in both the first and second stages of the disclosed process are employed in the customary catalytic amounts, which will normally vary from 0.1 percent to 5.0 percent of catalyst based on the total weight of the reactants in the reaction which is to be catalyzed.

While boron trifluoride will function as an alkylation catalyst to catalyze the second step of the disclosed process it is not a particularly desirable alkylation catalyst since it tends to promote undesirable side reactions. It is therefore preferred to remove the boron trifluoride catalyst when it is employed in the first step of the reaction before proceeding with the second or alkylation step of the disclosed process. The boron trifluoride catalyst may be effectively removed by destroying it with a basic material such as ammonia, or a solution of sodium hydroxide or sodium carbonate. Alternatively the boron trifluoride catalyst may be removed along with excess phenolic materials by heating the reaction mixture to a temperature from 100 to 160° C. under vacuum. An additional method of removing the boron trifluoride catalyst employed in the first step of the disclosed process is by refluxing the reaction mixture from step one with a small quantity of an inert organic solvent such as toluene at a temperature between 150 and 160° C. In either of the latter two methods the boron trifluoride may be recovered and subsequently reused in catalyzing the reaction of step one. The acidic alkylation catalyst employed to catalyze the second step of the disclosed process is normally neutralized with a suitable basic material such as a sodium carbonate solution.

The reaction defined as step one of the disclosed two-step process wherein dicyclopentadiene is reacted with a phenolic compound is conducted at a temperature from 25 to 160° C. Preferred reaction temperatures are between 80 and 150° C. The reaction between dicyclopentadiene and a phenolic compound may be started at room temperature and since the reaction is quite rapid and exothermic the heat of reaction may be used to obtain the final reaction temperature. If adequate cooling facilities are available the reaction may be carried out on a continuous basis.

The molar ratio of phenolic compound to dicyclopentadiene employed in the reaction mixture of stage one of the disclosed process can be varied from 1:1 or 5 or more mols of phenolic compound per mol of dicyclopentadiene. The proportions usually employed range from 2:1 to 4:1 mols of phenolic compound per mol of dicyclopentadiene, a preferred ratio being 3:1. The above preferred proportions of reactants provide for a substantial excess of the phenolic compound beyond that which will actually react with the dicyclopentadiene. The molar proportions of phenolic compound which reacts with dicyclopentadiene usually varies from 1:1 to 2:1 with the preferred molar ratio of reactants in the product obtained from step one of the disclosed process ranging from 1.50 to 1.75 mols of phenolic compound per mol of dicyclopentadiene. In some instances it may be desirable to carry out stage one of the disclosed process in an inert organic solvent such as benzene, toluene, etc. The employment of a solvent is particularly desirable if a relatively low ratio of phenolic compound to dicyclopentadiene is used. When the molar ration of phenolic compound to discyclopentadiene is 3 or more the excess phenolic compound acts as an effective solvent and no additional solvent need be employed.

Step one of the present process may be carried out by adding the dicyclopentadiene to the mixture of phenolic compound and catalyst or the catalyst may be added gradually to the mixture of phenolic compound and dicyclopentadiene, the first of these two procedures is preferred. The rate at which the reactants are combined can vary over a wide range as long as the temperature is kept below 160° C.

The second step of the disclosed process involves alkylation of the product obtained in step one. In carrying out the second step of the process the resinous product obtained from step one is dissolved in an equal quantity of an inert hydrocarbon solvent such as benzene, toluene, etc. Alkylation is conducted at a temperature between 20 and 100° C. A preferred temperature range is between 60 and 80° C. If the tertiary olefin which is employed as an alkylation agent is a gas it may be added to the reaction under pressure but the pressures should not exceed 30 p.s.i. if excessive polymerization is to be avoided. In step two of the process it is also preferable to carry out the alkylation as rapidly as possible, however, the time within which the reaction is completed is dependent upon the activity of the alkylating agent used.

While certain representative embodiments and details have been shown for the purpose of illustrating the invention, it will be apparent to those skilled in this art that various changes and modifications may be made therein without departing from the spirit or scope of the invention.

What is claimed is:

1. In a method of molding polyurethane wherein metallic molds are subjected to elevated temperatures during the curing stage and are cooled prior to stripping the molded polyurethane article from the mold, the improvement comprising treating the mold with a mold release agent comprising a polymer of an alpha-olefin having from 2 to about 4 carbon atoms and a melting point of about 100 to 250° F. in sufficient carrier to permit the mold release agent to be applied, said polymer containing from about .3 to about 5 parts per hundred parts of a material selected from the class consisting of
  (A) the reaction product of
    (1) a phenolic material of the formula

where R is H, methyl, and ethyl, with dicyclopentadiene, and
    (2) the alkylated product of the reaction product of (1) above,
  (B) a methylene bis (tertiary alkyl alkyl) phenol where the alkyl radical has from 1 to 8 carbon atoms and the tertiary alkyl contains at least 3 carbon atoms, and
  (C) bis (hydroxy-tertiary alkyl alkyl benzoyl) alkyl phenol, said alkyl radical having from 1 to 8 carbon atoms and the tertiary alkyl radical contains at least 3 carbon atoms.

2. The method of claim 1 wherein the carrier is water.

References Cited
UNITED STATES PATENTS

| | | | |
|---|---|---|---|
| 2,985,617 | 5/1961 | Salyer et al. | 260—45.9 |
| 3,036,138 | 5/1962 | Mingasson et al. | 260—45.9 |
| 3,305,522 | 2/1967 | Spacht | 260—45.95 |

FOREIGN PATENTS 1,040,776   3/1959   Germany.

SAMUEL H. BLECH, *Primary Examiner.*

W. J. BRIGGS, Sr., *Assistant Examiner.*

U.S. Cl. X.R.

260—28.5, 29.6, 45.95; 264—130, 213